May 16, 1967
S. KISSILOV
3,319,905
HOSE REEL INSTALLATION
Filed Jan. 13, 1966
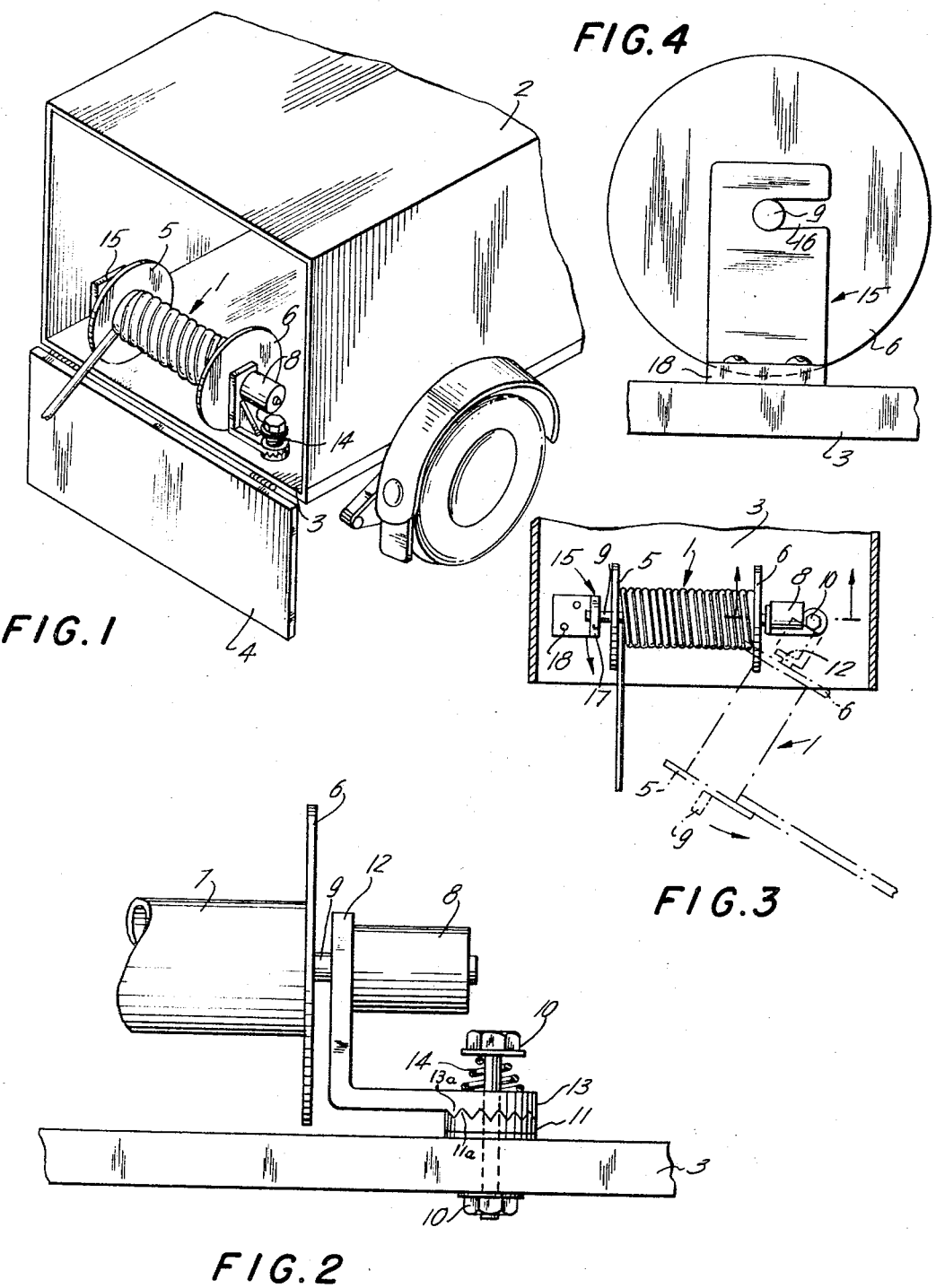

United States Patent Office 3,319,905
Patented May 16, 1967

3,319,905
HOSE REEL INSTALLATION
Shlomo Kissilov, 83 Arlozoroff St., Haifa, Israel
Filed Jan. 13, 1966, Ser. No. 520,424
5 Claims. (Cl. 242—86.2)

This invention pertains to reel installations. More particularly, it relates to an improved reel hose installation for automotive vehicles and other like conveyances.

In situations where it is desired to achieve the watering of gardens, cultivated plots and the like at different locations, it has been a common practice to mount a base reel permanently on an automotive vehicle, suitably a truck, and then bring such vehicle to each of the places to be watered, connect the reel to a water source thereat, and then effect the watering operation.

Because such hose reels are mounted to be stationary on the vehicle, they have presented the disadvantage of not being flexibly utilizable in all directions from the vehicles and, consequently there has been required in their use, the constant repeated need to move the vehicle to adapt the reel for use in a wider angular range. Concomitantly in situations where other equipment for example, has to be located near the base operator, quite often, to avoid the interference of such equipment with the operation of the hose reel, the vehicle also has to be moved.

Accordingly, it is an important object of this invention to provide a hose reel installation adapted for use in a vehicle or conveyance which has a substantially improved angular range of operation as compared with known hose reel installations which are employed for like purposes.

It is another object to provide a hose reel installation in accordance with the preceding object which can be maintained in a relatively stationary position throughout its angular range.

It is a further object to povide a hose reel in accordance with the preceding objects which is maintainable in a stationary position in the conveyance.

Generally speaking, and in accordance with the invention, there is provided a hose reel apparatus comprising a pair of standards and a spindle disposed between the standards for receiving a hose thereon. A first circular member is provided which is adapted to be fixedly attached to a hose, the circumferential periphery of the upper surface of this member being comprised of a substantially circular array of serrations. There is also included a second member affixed to the reel and terminating in a circular structure of like dimension as the first member, the circumferential periphery of the lower surface of the circular structure being comprised of a substantially circular array of serrations corresponding to the serrations of the first member and interdigitating therewith, whereby the rotation of the circular structure on the first member effects a corresponding angular movement of the hose reel, the interdigitating serrations enabling the anchoring of the hose reel in such movement in small incremental angular steps, each of the steps corresponding to the angular width of the serrations.

For a better understanding of the invention together with other and further objects thereof, reference is had to the following description taken in conjunction with the accompanying drawing and its scope is pointed out in the appended claims.

In the drawing, FIG. 1 is a three-dimensional view of an illustrative embodiment constructed in accordance with the principles of the invention;

FIG. 2 is a fragmentary view of a portion of the embodiment shown in FIG. 1;

FIG. 3 is a plan view, partly in section illustrating the operation of the invention; and FIG. 4 is an end elevational view of a further aspect of the invention.

Referring now to FIG. 1, there is shown therein a hose reel installation 1 constructed in accordance with the principles of the invention which is shown disposed on the floor 3 of a conveyance 2 which may suitably be a truck and which has a tail gate 4. The hose reel comprises end standards 5 and 6 with a spindle 7 extending therebetween, a flexible hose such as a rubber or like elastomer material hose being wound around the spindle. The base may be unwound from the reel by the normal pulling force applied by the operator thereof and can be automatically unwound or rewound through the action of a motor which is adapted to be energized by suitable means such as the electrical system of the conveyance or an independent electrical power source, the drive shaft 9 of motor 8 extending from motor 8 through standards 6 and 7 and through spindle 7 to rotate the spindle.

As is seen in FIGS. 1 and 2, hose reel 1 is affixed to floor 3 only at one end, i.e., the end at which standard 6 is located as shown in the figs. Such affixing is effected by a mounting which includes a bolt which extends through floor 3 from the under surface thereof to a point above floor 3. On the upper surface of floor 3 there is provided a circular disk like member 11 having serrations 11a on its upper periphery.

A member 12 having an L-shaped profile terminates in its horizontal leg in a disk like member 13 having serrations 13a on the periphery of its lower surface, the serrations of members 11 and 13 being in correspondence and adapted to intimately interdigitate, member 12 being mounted on shaft 9.

With the arrangement as described, hose reel 1 can be pivotedly moved through the rotation of member 13 about the shanks of bolt 10 on member 11 for at least an angle of 90°, the interdigitating serrations on members 11 and 13 enabling the reel to be anchored in place at small increments of angular movement, such anchoring being aided by the tensioning action of a spring 14 provided for such purpose. FIG. 3 shows a moved position of hose reel 1, such position being attained by the counterclockwise rotation of hose reel 1 as viewed in the drawing.

It is thus seen that the combination of members 11 and 13, spring 14 and bolt 10 effectively comprise a spring loaded friction clutch which enables an angular pivoting of hose reel 1 at desirably small incremental angular steps within a wide angular range.

Since, because of the pivot construction, hose reel 1 is not anchored at one of its ends, i.e., the end where standard 5 is located, to ensure that there is no movement of the hose reel when it is within the conveyance and the conveyance is being moved an anchoring arrangement is provided therefor as shown in FIG. 4.

As seen in FIG. 4 an L-shaped member 15 is provided, member 15 having a base 18 which is suitably affixed to floor 3 and an upright arm 17. Arm 17 is provided with a recess 16 adapted to snugly receive therein shaft 9. Member 15 is disposed adjacent standard 5 and close enough to it so that when reel hose 1 is disposed within conveyance 2 and substantially parallel to the rear edge of conveyance 2, shaft 9 is snugly received in recess 16. With this arrangement, hose reel 1 is maintained stationary within conveyance 2 and rendered immobile when conveyance 2 is in motion.

While there has been described what is considered to be a preferred embodiment of this invention, it will be obvious to those skilled in the art that various changes and modifications may be made therein without departing from the invention and, accordingly, it is intended in the appended claims to cover all such changes and modifications as fall within the spirit and scope of the invention.

What is claimed as new and desired to be secured by Letters Patent of the United States is:

1. A hose reel apparatus comprising a pair of standards, a spindle disposed between said standards for receiving a hose thereon, a first circular member adapted to be fixedly attached to a base, the circumferential periphery of the upper surface of said member being comprised of a substantially circular array of serrations, a second member affixed to said reel and terminating in a circular structure of like dimension as said first member, the circumferential periphery of the lower surface of said circular structure being comprised of a substantially circular array of serrations corresponding to the serrations of said first member and interdigitating therewith, whereby the rotation of said circular structure on said first member effects a corresponding angular movement of said hose reel, said interdigitating serrations enabling the anchoring of said hose reel in said movement in small incremental angular steps, each of said steps corresponding to the angular width of said serrations.

2. A hose reel apparatus as defined in claim 1 and further including tensioning means associated with said first member and said circular structure for reinforcing said anchoring.

3. A hose reel apparatus as defined in claim 2 and further including a motor having a shaft which extends through said spindle and is affixed thereto to automatically unwind and rewind said hose about said spindle.

4. A hose reel apparatus as defined in claim 3 wherein said first member is mounted on said base at a given spacing from one of said standards, said shaft of said motor extending through said spindle from said one standard through the other of said standards, and further including a flat member adapted to be affixed to said base at a spacing from the other of standards, said flat member including a recess therein for snugly receiving the end of said shaft extending through the other of said standards to firmly position said hose reel on said base.

5. A hose reel apparatus as defined in claim 4 wherein said second member comprises an L-shaped structure having a vertical leg which is affixed to said motor shaft between said motor and said one standard and a horizontal leg which terminates in said circular structure.

References Cited by the Examiner

UNITED STATES PATENTS

| | | | |
|---|---|---|---|
| 215,709 | 5/1879 | Abbott | 242—86.2 |
| 1,649,224 | 11/1927 | Griffin | 242—99 |
| 2,301,208 | 11/1942 | Gear | 242—86 |
| 2,743,883 | 5/1956 | Farmer | 242—86.5 |

FRANK J. COHEN, *Primary Examiner.*

N. L. MINTZ, *Assistant Examiner.*